United States Patent
Kawaoka et al.

(10) Patent No.: US 7,003,179 B2
(45) Date of Patent: Feb. 21, 2006

(54) SHEET-RECOGNIZING MACHINE

(75) Inventors: Akihiro Kawaoka, Nagoya (JP);
Tetsuo Machida, Tokyo (JP); Tetsuro Kiyomatsu, Seto (JP); Toshinori Kajiura, Ichinomiya (JP)

(73) Assignee: Hitachi, Ltd., Tokyo (JP)

( * ) Notice: Subject to any disclaimer, the term of this patent is extended or adjusted under 35 U.S.C. 154(b) by 673 days.

(21) Appl. No.: 09/836,467

(22) Filed: Apr. 18, 2001

(65) Prior Publication Data

US 2002/0003901 A1    Jan. 10, 2002

(30) Foreign Application Priority Data

Apr. 21, 2000  (JP)  .............................. 2000-120886

(51) Int. Cl.
*G06K 9/60*    (2006.01)
(52) U.S. Cl. ...................................... 382/305; 358/442
(58) Field of Classification Search ............ 707/104.1; 382/224–227, 305, 181–183; 358/403, 406, 358/408, 442
See application file for complete search history.

(56) References Cited

U.S. PATENT DOCUMENTS

| | | |
|---|---|---|
| 5,434,933 A | 7/1995 | Karnin et al. |
| 5,787,434 A * | 7/1998 | Nakamura et al. .......... 707/102 |
| 6,687,708 B1 * | 2/2004 | Brobst et al. ........... 707/103 Y |
| 6,763,346 B1 * | 7/2004 | Nishida et al. ................. 707/2 |
| 6,768,558 B1 * | 7/2004 | Yamashita et al. ......... 358/1.18 |
| 6,775,023 B1 * | 8/2004 | Fukunaga et al. ......... 358/1.15 |

FOREIGN PATENT DOCUMENTS

| | | |
|---|---|---|
| JP | 06-110910 | 4/1994 |
| JP | 11-167603 | 6/1999 |
| JP | 2000-209424 A * | 7/2000 |

* cited by examiner

*Primary Examiner*—Jingge Wu
(74) *Attorney, Agent, or Firm*—Mattingly, Stanger, Malur & Brundidge, P.C.

(57) ABSTRACT

Sheet definition data stored in a sheet definition data managing apparatus is supplied when necessary to a sheet recognizing apparatus to reduce a configuration cost of a sheet definition database. A sheet recognizing system has: a sheet definition managing apparatus including a sheet definition data generating apparatus for generating sheet definition data representative of a relation between a data writing field of a sheet and the written data and a charge managing apparatus for claiming a charge in accordance with a use degree of the sheet definition data by a sheet recognizing and processing apparatus; a communication network for transmitting the sheet definition data managed by the sheet definition data managing apparatus to the sheet recognizing and processing apparatus; and a sheet recognizing apparatus for recognizing the type of the sheet by referring to the sheet definition data acquired via the network.

14 Claims, 17 Drawing Sheets

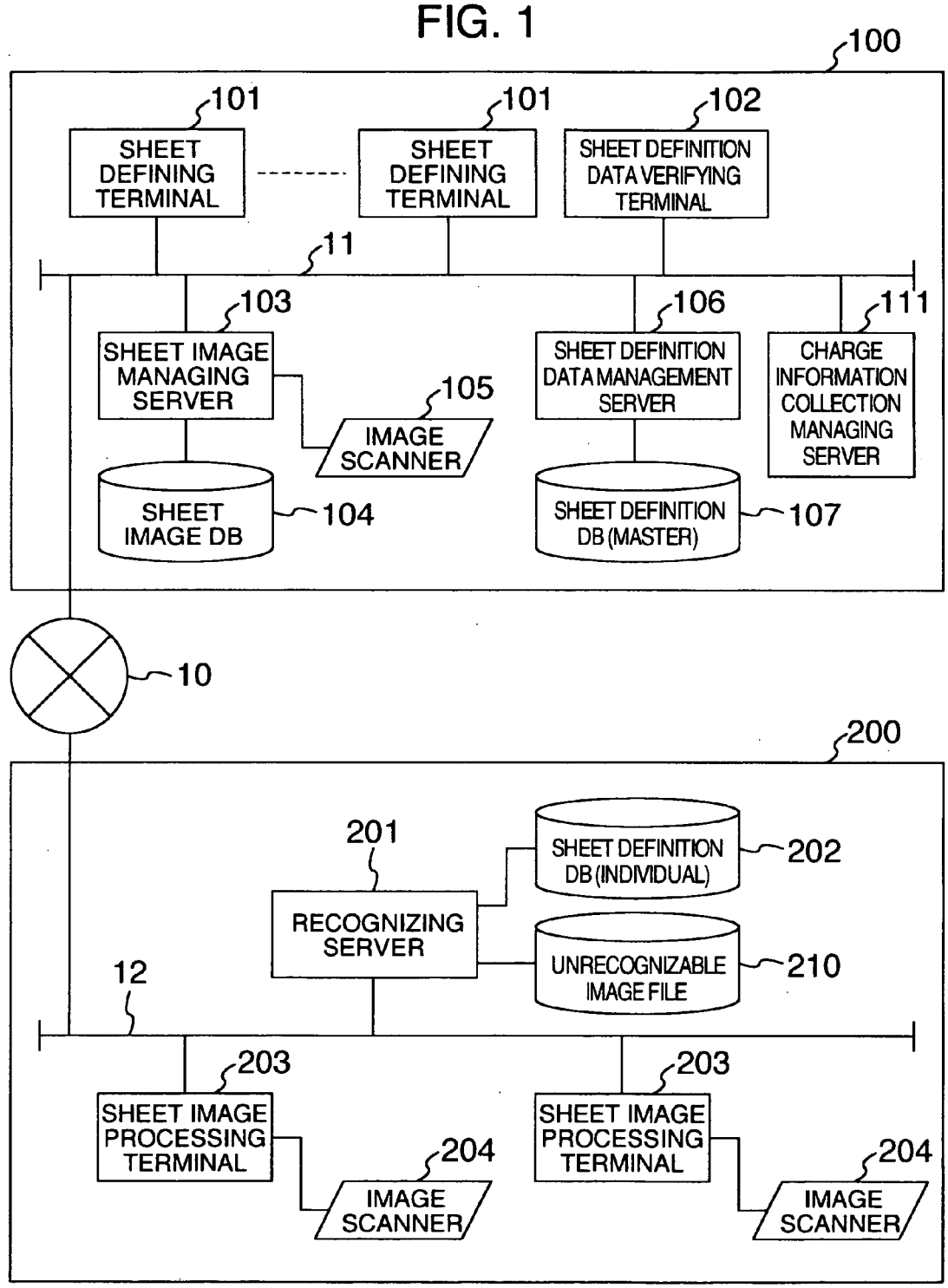

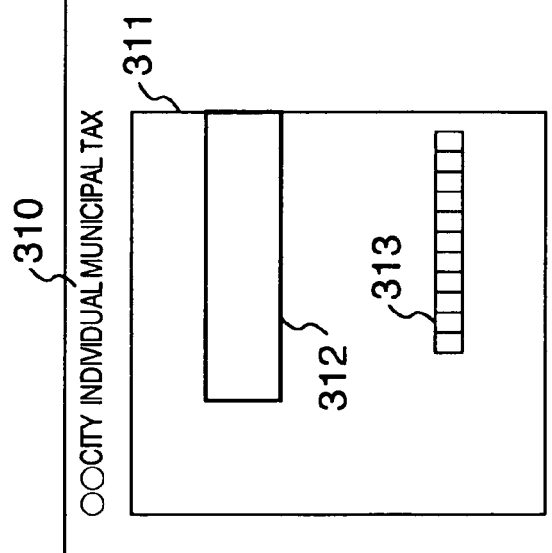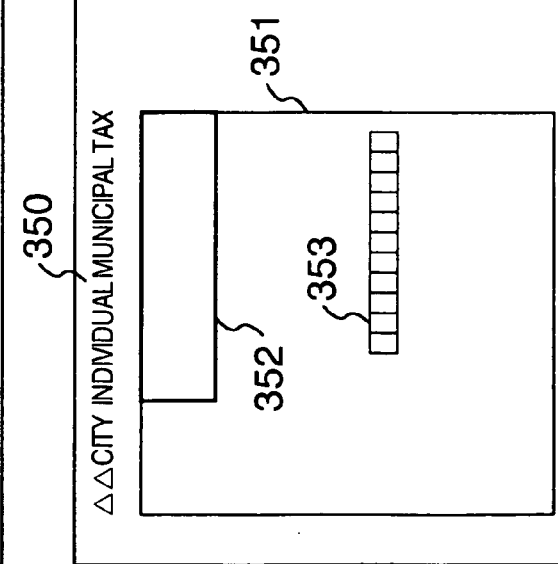

FIG. 4A

| ITEM NAME | | DATA |
|---|---|---|
| SHEET ID | | Id-11 |
| SIZE (x,y) | | 3000, 1200 |
| CHARACTER 1 | POSITION (x,y) | 100,50 |
| | CHARACTER STRING | ○○CITY INDIVIDUAL MUNICIPAL TAX |
| RECTANGLE 1 | START POSITION (x,y) | 100,200 |
| | END POSITION (x,y) | 900,1250 |
| RECTANGLE 2 | START POSITION (x,y) | 350,300 |
| | END POSITION (x,y) | 900,450 |
| CONTINUOUS RECTANGLE 1 | START POSITION (x,y) | 450,800 |
| | NUMBER OF CONTINUOUS RECTANGLES | 11 |
| | SIZE (x,y) | 70,35 |

FIG. 4B

| ITEM NAME | | DATA |
|---|---|---|
| SHEET ID | | Id-12 |
| SIZE (x,y) | | 3000, 1200 |
| CHARACTER 1 | POSITION (x,y) | 100,50 |
| | CHARACTER STRING | △△CITY INDIVIDUAL MUNICIPAL TAX |
| RECTANGLE 1 | START POSITION (x,y) | 100,200 |
| | END POSITION (x,y) | 900,1250 |
| RECTANGLE 2 | START POSITION (x,y) | 350,200 |
| | END POSITION (x,y) | 900,350 |
| CONTINUOUS RECTANGLE 2 | START POSITION (x,y) | 450,700 |
| | NUMBER OF CONTINUOUS RECTANGLES | 11 |
| | SIZE (x,y) | 70,35 |

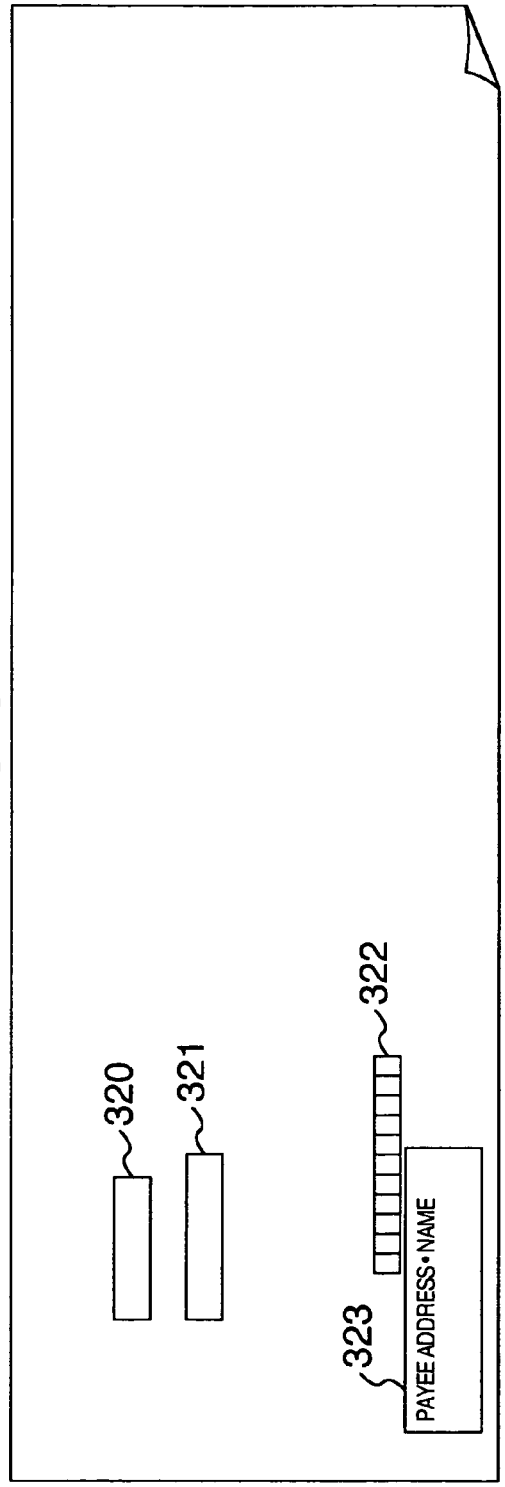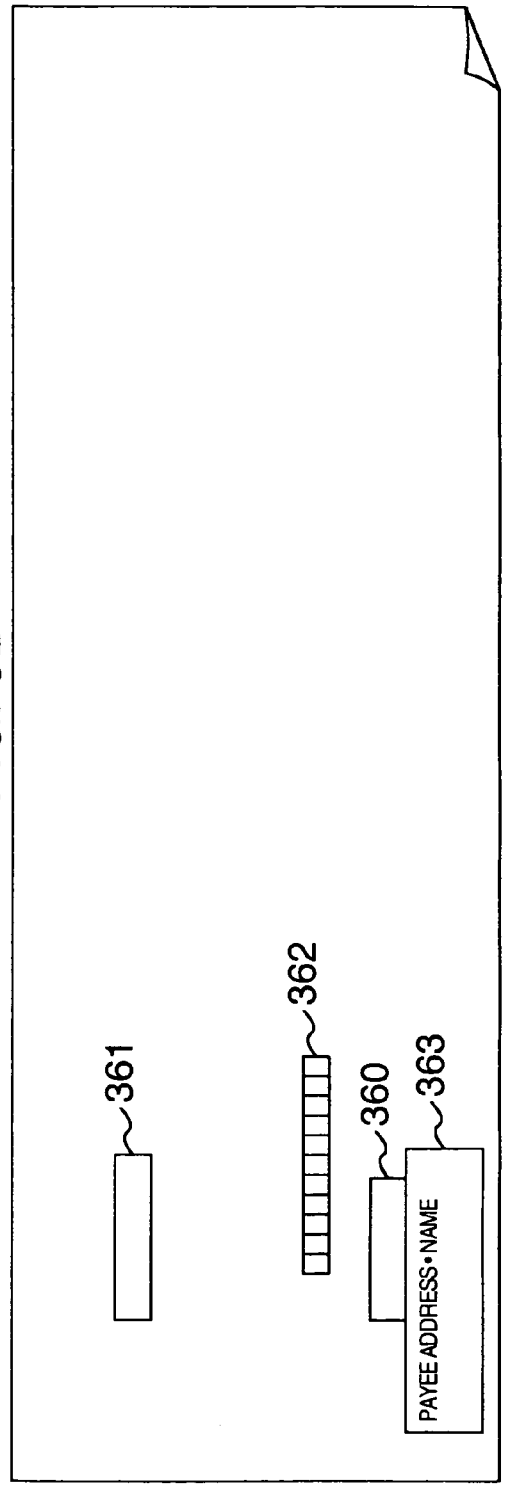

| ITEM NAME | | DATA |
|---|---|---|
| SHEET ID | | Id-11 |
| FIELD 1 | FIELD ATTRIBUTE | ACCOUNT NO. |
| | FRAME TYPE | FIELD FRAME |
| | START POSITION (x,y) | 350,225 |
| | FRAME SIZE | 300,75 |
| | FONT TYPE | NUMERAL |
| FIELD 2 | FIELD ATTRIBUTE | DESIGNATION NO. |
| | FRAME TYPE | FIELD FRAME |
| | START POSITION (x,y) | 350,375 |
| | FRAME SIZE | 350,75 |
| | FONT TYPE | NUMERAL |
| FIELD 3 | FIELD ATTRIBUTE | MONEY AMOUNT |
| | FRAME TYPE | CHARACTER FRAME |
| | START POSITION (x,y) | 450,800 |
| | FRAME SIZE | 35,70 |
| | FONT TYPE | NUMERAL |
| | NUMBER OF CHARACTERS | 11 |
| FIELD 4 | FIELD ATTRIBUTE | ADDRESS NAME |
| | FRAME TYPE | FIELD FRAME |
| | START POSITION (x,y) | 100,900 |
| | FRAME SIZE (x,y) | 600,250 |
| | FONT TYPE | IMAGE ONLY |
| | PRE-PRINT (DELETE) | START POSITION (x,y) | 100,900 |
| | | END POSITION (x,y) | 400,50 |

| ITEM NAME | | DATA |
|---|---|---|
| SHEET ID | | Id-12 |
| FIELD 1 | FIELD ATTRIBUTE | ACCOUNT NO. |
| | FRAME TYPE | FIELD FRAME |
| | START POSITION (x,y) | 350,825 |
| | FRAME SIZE | 300,75 |
| | FONT TYPE | NUMERAL |
| FIELD 2 | FIELD ATTRIBUTE | DESIGNATION NO. |
| | FRAME TYPE | FIELD FRAME |
| | START POSITION (x,y) | 350,275 |
| | FRAME SIZE | 350,75 |
| | FONT TYPE | NUMERAL |
| FIELD 3 | FIELD ATTRIBUTE | MONEY AMOUNT |
| | FRAME TYPE | CHARACTER FRAME |
| | START POSITION (x,y) | 450,700 |
| | FRAME SIZE | 35,70 |
| | FONT TYPE | NUMERAL |
| | NUMBER OF CHARACTERS | 11 |
| FIELD 4 | FIELD ATTRIBUTE | ADDRESS NAME |
| | FRAME TYPE | FIELD FRAME |
| | START POSITION (x,y) | 100,900 |
| | FRAME SIZE (x,y) | 600,250 |
| | FONT TYPE | IMAGE ONLY |
| | PRE-PRINT (DELETE) START POSITION (x,y) | 100,900 |
| | END POSITION (x,y) | 400,50 |

FIG. 7

SHEET INPUT CONFIRMATION SCREEN

SHEET NAME: ○○CITY MUNICIPAL TAX PAYMENT SHEET

| MONEY AMOUNT | ▮▮▮▮▮▮1 0 0 0 0 |
| --- | --- |
| | 1 0 0 0 0 |

| ACCOUNT NO. | 0123-4-567890 |
| --- | --- |
| | 0123-4-567890 |

| DESIGNATION NO. | 0 0 5 4 3 2 1 |
| --- | --- |
| | 0 0 5 4 2 2 1 |

| ADDRESS · NAME | □□ KEN ○○ SHI ×× CHOU1-2-3 ●●●● Esq. |
| --- | --- |

FIG. 12

| CLASSIFICATION | SHEET NAME | SHEET ID | RECOGNIZING APPARATUS1 | RECOGNIZING APPARATUS2 | ---- | RECOGNIZING APPARATUSN |
|---|---|---|---|---|---|---|
| INHABITANT TAX | ○○ CITY MUNICIPAL TAX | Id-11 | ○ | ○ | | ○ |
| | △△ CITY MUNICIPAL TAX | Id-12 | | ○ | | |
| | -- | -- | | | | |
| | name-1i | Id-1i | ○ | | | ○ |
| CATEGORY2 | name-21 | Id-21 | | ○ | | △ |
| | name-22 | Id-22 | | ○ | | |
| | -- | -- | | | | |
| | name-2j | Id-2j | | ○ | | |
| CATEGORY3 | name-31 | Id-31 | ○ | | | ○ |
| | name-32 | Id-32 | ○ | | | |
| | -- | -- | | | | |
| | name-3k | Id-3k | ○ | | | |
| CATEGORY4 | name-41 | Id-41 | △ | | | |
| | name-42 | Id-42 | △ | | | |
| | -- | -- | | | | |
| | name-4m | Id-4m | △ | | | |
| ----- | | | | | | |
| | | | | ○○ | | |
| CATEGORYN | name-N1 | Id-N1 | | ○ | | |
| | name-N2 | Id-N2 | | | | |
| | -- | -- | | | | |
| | name-Nn | Id-Nn | | ○ | | △ |

| SHEET ID | NUMBER OF USE TIMES |
|---|---|
| Id-11 | 1,150 |
| Id-12 | 3,200 |
| ⋮ | |
| Id-1i | 2 |
| Id-31 | 10,580 |
| Id-32 | 830 |
| ⋮ | |
| Id-3k | 4,170 |
| Id-41 | 26,180 |
| Id-42 | 37,220 |
| ⋮ | |
| Id-4m | 8,640 |
| | |
| | |
| | |
| | |

| CLASSIFICATION | SHEET NAME | SHEET ID | RECOGNIZING APPARATUS 1 | RECOGNIZING APPARATUS 2 | ------ | RECOGNIZING APPARATUS N |
|---|---|---|---|---|---|---|
| INHABITANT TAX | ○○ CITY MUNICIPAL TAX | Id-11 | 1,234 | 598 | | 25 |
| | △△ CITY MUNICIPAL TAX | Id-12 | 560 | 3,078 | | |
| | ⋮ | ⋮ | | | | |
| | name-1i | Id-1i | 32 | 407 | | 77 |
| CATEGORY 2 | name-21 | Id-21 | | 1,885 | | |
| | name-22 | Id-22 | | 558 | | 44,329 |
| | ⋮ | ⋮ | | | | |
| | name-2j | Id-2j | | 5,739 | | |
| CATEGORY 3 | name-31 | Id-31 | 4,100 | | | 37,210 |
| | name-32 | Id-32 | 987 | | | |
| | ⋮ | ⋮ | | | | |
| | name-3k | Id-3k | 333 | | | |
| CATEGORY 4 | name-41 | Id-41 | 676 | | | |
| | name-42 | Id-42 | 221 | | | |
| | ⋮ | ⋮ | | | | |
| | name-4j | Id-4m | 2,001 | | | |
| | | | | | | |
| | | | | | | |
| | | | | | | |
| | | | | | | |
| CATEGORY N | name-N1 | Id-N1 | | 11.673 | | |
| | name-N2 | Id-N2 | | 28.980 | | |
| | ⋮ | ⋮ | | | | |
| | name-Nn | Id-Nn | | 68,231 | | 7,468 |

| | | RECOGNIZING APPARATUS 1 | RECOGNIZING APPARATUS 2 | -------- | RECOGNIZING APPARATUS N |
|---|---|---|---|---|---|
| TOTAL NUMBER OF USE TIMES | | 1,324,000 | 876,000 | | 3,591,000 |
| | CHARGED | 1,012,000 | 876,000 | | 2,591,000 |
| | FREE | 312,000 | 0 | | 1,000,000 |
| AMOUNT CLAIMED | | 10,120,000 | 8,760,000 | | 25,910,000 |
| SUMMING DATE | | 2000/4/1 | 2000/4/1 | | 2000/4/1 |
| DATE CLAIMED | | 2000/4/1 | 2000/4/1 | | 2000/4/1 |
| DATE OF PAYMENT | | 2000/4/20 | 2000/4/15 | | NOT YET |

SHEET-RECOGNIZING MACHINE

BACKGROUND OF THE INVENTION

The present invention relates to a sheet-recognizing machine and more particularly to a sheet-recognizing machine or system for recognizing the type of a sheet or slip from acquired image data in accordance with sheet definition data stored in advance.

Generally, the format of a sheet such as a bill for public utilities charges and a statement of payment for taxes is defined by and changes with each business company or each local government. There are therefore several thousands types of sheet formats in the nation.

In order to realize efficient business management, financial agencies such as banks introduce an image processing system to process sheets. A sheet image processing system prepares a database storing sheet definition data for defining the types of sheets to automatically distinguish the type of each sheet by referring to the database. For example, refer to JP-A-11-167603.

SUMMARY OF THE INVENTION

For sheet image processing and recognition, sheet type definition data and the like are prepared and the sheet type is distinguished by using a database which stores sheet type definition data. However, as described earlier, since there are a large number of sheet format types, it is practically difficult to store definition data of all sheet types. If the format of a sheet is changed or a sheet very similar to an already existing sheet appears, it is necessary to change the definition data. It is therefore necessary to add or modify the database.

It takes a labor to store or modify the definition data in the database. Initial investment in configuring the database and maintenance cost become high. Furthermore, it is important to quickly collect the formats of currently circulating sheets and reflect them upon the database so that there is no sheet which cannot be distinguished by using the database.

The present invention has been made to solve the above-described problems and provides a sheet image processing machine with reduced database configuring and maintenance costs. In order to solve the above-described problems, the following means are adopted.

A sheet recognizing system has: a sheet definition managing apparatus including a sheet definition data generating apparatus for generating sheet definition data representative of a relation between a data writing field of a sheet and the written data and a charge managing apparatus for claiming a charge in accordance with a use degree of the sheet definition data by a sheet recognizing and processing apparatus; a communication network for transmitting the sheet definition data managed by the sheet definition data managing apparatus to the sheet recognizing and processing apparatus; and a sheet recognizing apparatus for recognizing the type of the sheet by referring to the sheet definition data acquired via the communication network. The sheet image processing apparatus stores image data of a sheet whose type cannot be distinguished by using the acquired information, and can transmit the stored image data to the sheet definition data managing apparatus.

BRIEF DESCRIPTION OF THE DRAWINGS

FIG. 1 is a diagram showing a sheet image processing system according to an embodiment of the invention.

Figures 2A, 2B:
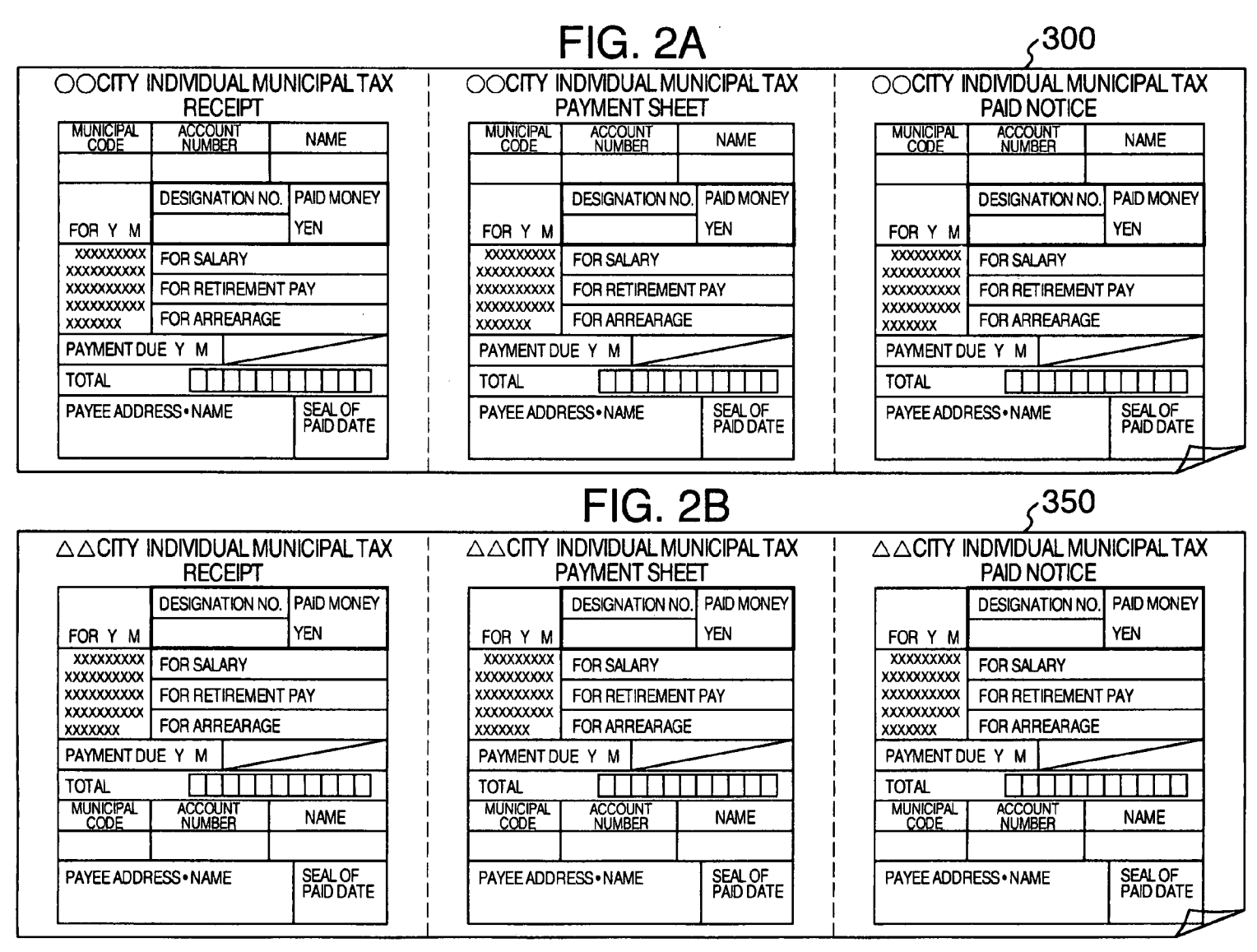

FIGS. 2A and 2B are diagrams showing examples of a sheet to be processed.

FIGS. 3A and 3B are diagrams showing data which is representative of characteristic fields and necessary for distinguishing between sheets.

FIGS. 4A and 4B are diagrams showing data for defining characteristic fields.

FIGS. 5A and 5B are diagrams showing fields required by application programs.

FIGS. 6A and 6B are diagrams showing data which defines fields required by application programs.

FIG. 7 is a diagram showing a character recognizing and confirming display screen.

FIG. 12 is a diagram showing a sheet management table.

FIG. 13 is a diagram showing a charge table.

FIGS. 14A and 14B are diagrams showing management tables.

DESCRIPTION OF THE EMBODIMENTS

Figure 8:
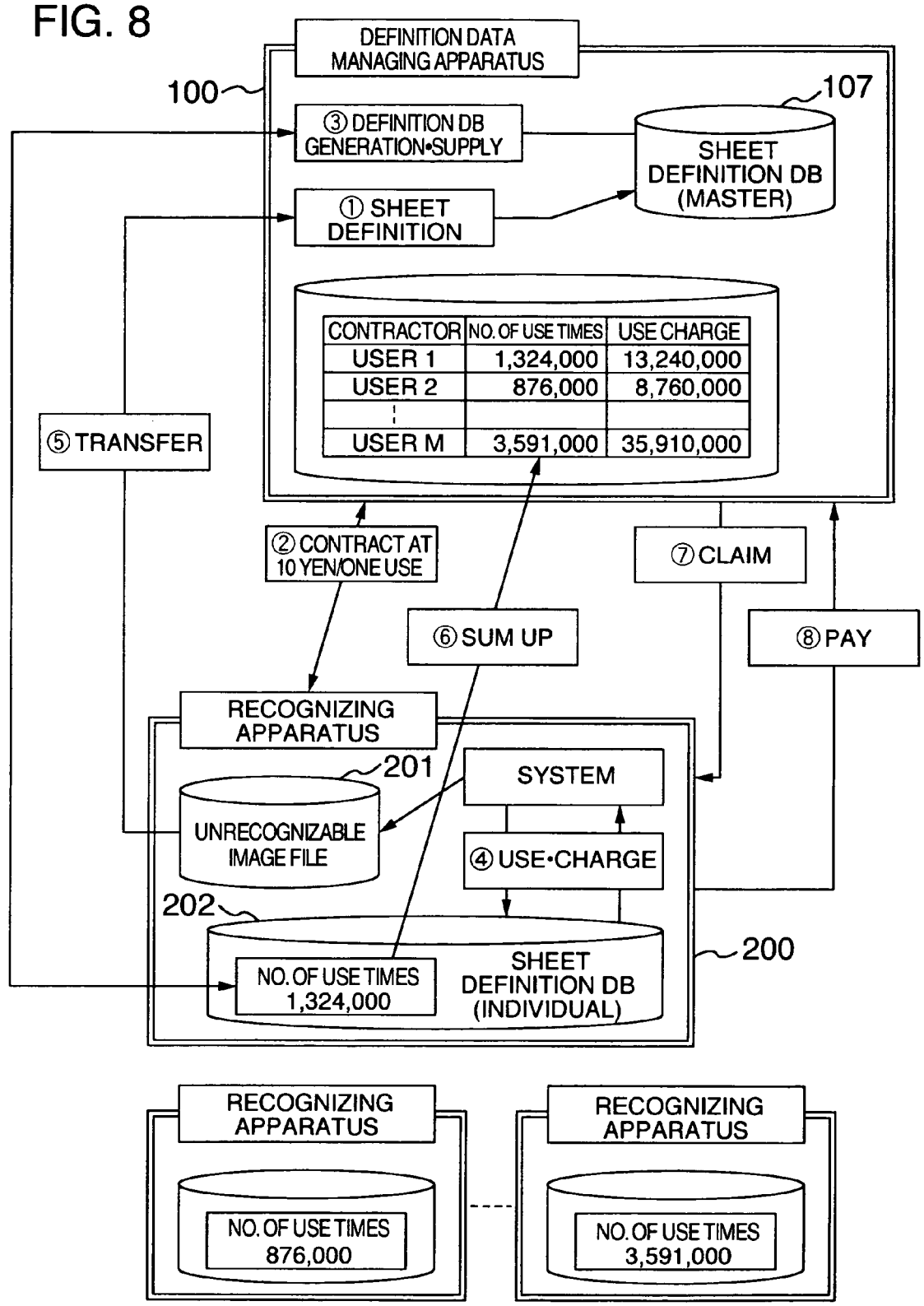
FIG. 8 is a diagram illustrating a sheet recognizing process to be executed by a sheet image processing system.

An embodiment of the invention will be described with reference to FIGS. 1 to 16. FIG. 1 is a diagram showing a sheet image processing apparatus or sheet image processing system according to the embodiment of the invention. In FIG. 1, a sheet definition data managing apparatus 100 generates sheet definition data representative of a relation between a sheet writing position and written data, and manages the generated sheet definition data. A sheet recognizing machine or apparatus 200 acquires the sheet definition data from the sheet definition data managing apparatus 100, and distinguishes the type of a sheet read with an image scanner or the like in accordance with the acquired sheet definition data.

An operator at a sheet defining terminal 101 enters image data of a sheet or sheet definition data while looking at the sheet. A sheet definition data verifying terminal 102 verifies whether the input sheet definition data is correct or not. A sheet image managing server 103 stores sheet image data in a sheet image database 104 and manages it. The sheet image data is read with an image scanner 105 or acquired from the sheet recognizing apparatus 200 via networks 10 and 11. A sheet image database 104 stores sheet image data, and the scanner 105 reads the image of a sheet. A sheet definition data managing server 106 stores the sheet definition data input from the sheet defining terminal 101 in a sheet definition database (master) 107 and manages the stored data. The data stored in the sheet definition database 107 is edited to classify it into the data to be used for each sheet recognizing apparatus 200 and supply it the classified data to the apparatus 200. Although only one sheet recognizing apparatus 200 is shown in FIG. 1, a plurality of sheet recognizing apparatus 200 are provided in practice. The data stored in the sheet definition database 107 is therefore edited to classify it into the data to be used for each sheet recognizing apparatus 200. A charge information managing server 111 manages charge data of each sheet recognizing apparatus 200 in accordance with the number of use times of the sheet definition data.

A recognizing server 201 distinguishes the type of a sheet read with an image scanner 204 in accordance with the sheet definition data acquired from the sheet definition data managing server 100. A sheet definition database (individual database) 202 provided for each sheet recognizing apparatus 200 stores the sheet definition data for the apparatus 200 acquired from the sheet definition data managing server 100. A sheet image processing terminal 203 transmits image data of a sheet read with the image scanner 204 to the recognizing server 201 via the network 12. The sheet image processing terminal 203 has an application program which provides various services such as a municipal tax paying process. A unrecognizable image file 210 stores image data of a sheet which the sheet recognizing server 201 cannot distinguish even if the sheet definition data is utilized. The sheet recognizing server 201 manages the sheet definition database 202 and unrecognizable image file 210. The recognizing server 201 also counts the number of use times of the sheet definition data stored in the sheet definition database 202 and transmits the number of use times to a charge information managing server 111.

FIGS. 2A and 2B are diagrams showing examples of a sheet to be processed by the sheet image processing apparatus. FIG. 2A shows a ○○ city individual municipal tax payment sheet 300 and FIG. 2B shows a △△ city individual municipal tax payment sheet 350. Each sheet is made of three separable sheets "Receipt Certificate", "Payment Sheet" and "Paid Notice". As shown in FIGS, 2A and 2B, although the sheets of two cities resemble closely, the city names are different and the positions and the like of a municipal code frame, an account number frame, a designation number frame, and a subscriber name frame are also different. This is because ○○ city forms a payment sheet specific to ○○ city, and △△ city forms a payment sheet specific to △△ city.

FIGS. 3A and 3B are diagrams showing the data (characteristic field data) which is representative of characteristic fields and necessary for distinguishing between sheets shown in FIGS. 2A and 2B, and FIGS. 4A and 4B are diagrams showing the data for defining the characteristic fields shown in FIGS. 3A and 3B.

The sheet recognizing apparatus 200 distinguishes the type of a sheet, e.g., a sheet ID, from the characteristic field data shown in FIGS. 3A and 3B by referring to the layout definition data shown in FIGS. 4A and 4B. Layout definition data 410 shown in FIG. 4A defines the characteristic field (FIG. 3A) in the ○○ city individual municipal tax payment sheet. Of the layout definition data, "sheet ID" is a unique number assigned to the "○○ city individual municipal tax payment sheet". "Size" defines the size of the sheet. In this example, the unit is ¹⁄₁₀ mm. "Character 1" represents characters "○○ city individual municipal tax" 310 shown in FIG. 3A and defines a distance from an origin (upper left) and a character string. "Rectangle 1" represents a rectangle 311 shown in FIG. 3A and defines a start position and an end position as distances from the origin. "Rectangle 2" represents a rectangle 312 shown in FIG. 3A and defines a start position and an end position as distances from the origin. "Continuous rectangle 1" represents a rectangle 313 shown in FIG. 3A and defines a start position as a distance from the origin, and the number of continuous rectangles and the size of one rectangle. Layout definition data 460 shown in FIG. 2B defines the characteristic field shown in FIG. 3B in the □□city individual municipal tax payment sheet, and is structured in a manner similar to the layout definition data for defining the characteristic fields in the ○○ city individual municipal tax payment sheet. By using the layout definition data shown in FIG. 3B, the sheet image processing terminal 203 distinguishes the type of a sheet read with the scanner or the like.

FIGS. 5A and 5B show fields of the sheets shown in FIGS. 2A and 2B. The field is necessary for a recognizing application program to recognize the sheet. In the examples shown in FIGS. 5A and 5B, FIG. 5A shows fields 320 to 323 in the ○○ city individual municipal tax payment sheet required by the application program, and FIG. 5B shows fields 361 to 363 in the △△ city individual municipal tax payment sheet required by the application program. The application program runs on the sheet image processing terminal 203 and provides services such as a municipal tax paying process.

FIGS. 6A and 6B are diagrams showing data (format definition data) for defining the fields shown in FIGS. 5A and 5B required by the application program. The sheet recognizing apparatus 200 recognizes the information written in each field of a sheet by referring to the format definition data. In FIG. 6A, reference numeral 420 represents format definition data of the ○○ city individual municipal tax payment sheet shown in FIG. 2A. In FIG. 6A, "Field 1" represents the "account number" 320 shown in FIG. 5A and defines a field attribute, a frame type, a start position, a frame size, and a font type. "Field 2" represents the "designation number" 321 shown in FIG. 5A and defines a field attribute, a frame type, a start position, a frame size, and a font type. "Field 3" represents the "amount of money" 322 shown in FIG. 5A and defines a field attribute, a frame type, a start position, a frame size, a font type and the number of characters. "Field 4" represents the "address name" 323 shown in FIG. 5A and defines a field attribute, a frame type, a start position, a frame size, a font type and the start and end positions of pre-print to be deleted. Reference numeral 470 represents the format definition data of the △△ city individual municipal tax payment sheet shown in FIG. 2B, and is structured in a manner similar to the format definition data of the ○○ city individual municipal tax payment sheet. Numerical values for the positions and the like are different as described with reference to FIGS. 2A and 2B.

It is desired that the format definition data for all fields are prepared in order to allow various application programs can share the format definition data. A plurality set of format definition data may be prepared for one sheet. Although the layout definition data and format definition data are supplied separately, they may be supplied integrally. By using the format definition data shown in FIGS. 6A and 6B, characters, numerals and the like in the sheets shown in FIGS. 2A and 2B are recognized and the recognition results are displayed (which will be described later).

FIG. 7 is a diagram showing a character recognizing and confirming display screen of the sheet image processing terminal 203. An operator corrects the character recognition results of the image scanner while displaying this screen on the sheet image processing terminal 203. In FIG. 7, in the upper area (painted black), cut-out image data is displayed, and in the lower area, the recognition results are displayed. The operator compares the data in both the areas and can correct the data if necessary. "?" in the "designation No" field indicates an unrecognizable character.

FIG. 8 is a diagram illustrating a sheet recognizing process to be executed by the sheet image processing apparatus or sheet recognizing system. In FIG. 8, numerals surrounded with circles such as 1 and 2 with circles (①, ②, etc.) represent an example of Steps of the sheet recognizing process. At Step 1, the sheet definition data shown in FIGS. 4A and 4B and FIGS. 6A and 6B is generated to configure the sheet definition database 107. At Step 2, a use contract of the sheet definition database (e.g., charge per use of the sheet definition data: 10 Yen/one use) is made between the sheet recognizing apparatus 200 side and the sheet definition data managing apparatus 100 side. At Step 3, the sheet definition data managing apparatus 100 configures a sheet definition database (individual database) storing sheet definition data satisfying the requirements of the sheet recognizing apparatus 200 side and transmits the sheet definition database to the sheet recognizing apparatus 200. At Step 4, by using the received sheet definition database (individual database), the sheet recognizing apparatus 200 performs image processing of the image data of a sheet read with the image scanner 204 to distinguish the type of the sheet. In this case, a charge process is performed in accordance with the number of use times of the sheet definition data. The image data of a sheet which cannot be recognized by using the sheet definition database (individual database) is stored in the unrecognizable image file 210. At Step 5, the sheet definition data managing apparatus 100 acquires the image file stored in the unrecognizable image file 210, and generates sheet definition data in accordance with the image file to supplement or update the sheet definition database. At Step 6, the sheet definition data managing apparatus 100 acquires and sums up the charge information from the sheet recognizing apparatus 200. At Step 7, in accordance with the summed-up charge information, a use charge is claimed to the sheet recognizing apparatus 200 side. At Step 8, the sheet recognizing apparatus 200 side pays the claimed charge.

Figure 9:
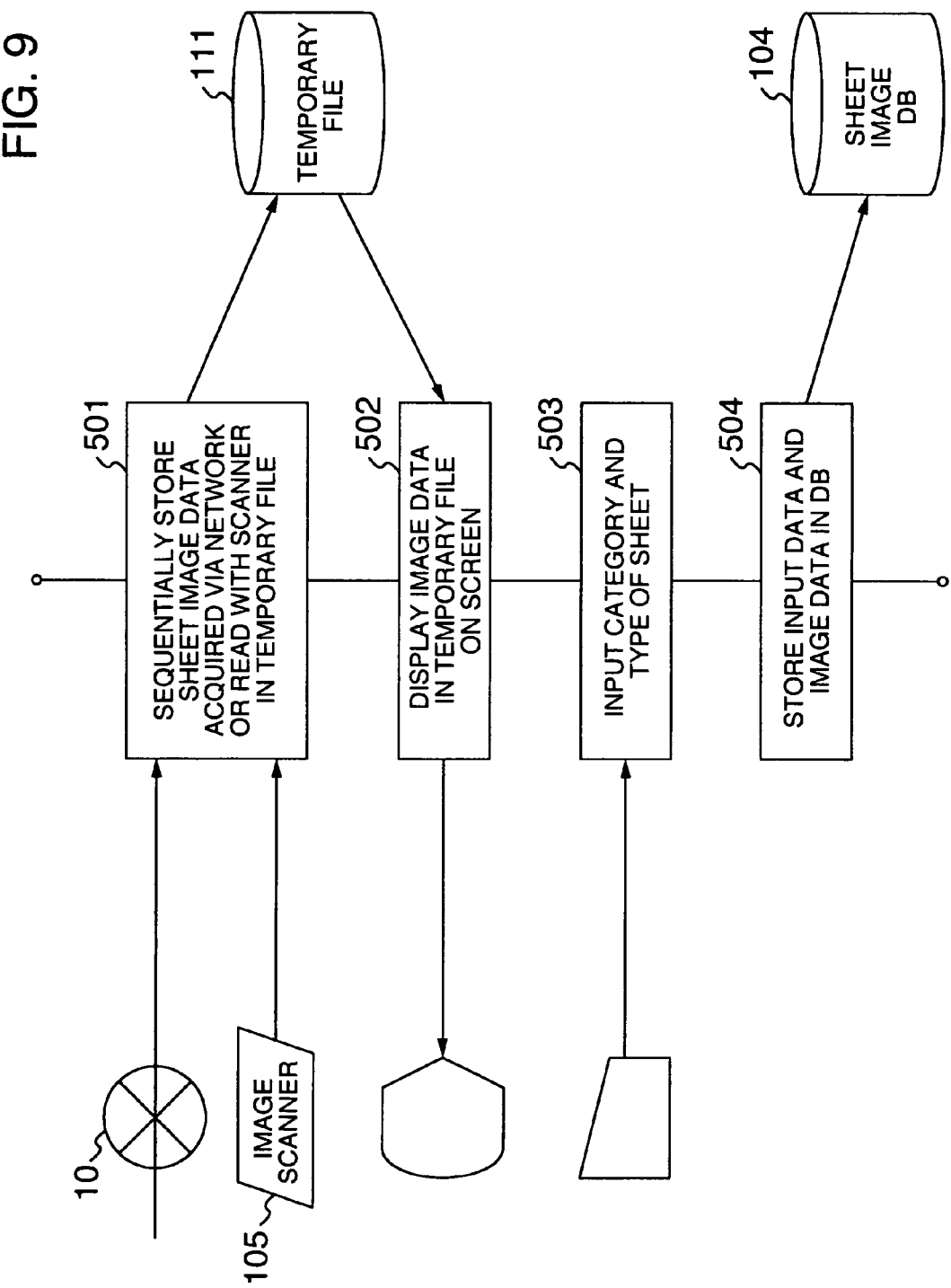
FIG. 9 is a flow chart illustrating a process to be executed by a sheet image managing server.

FIG. 9 is a flow chart illustrating the function of the sheet image managing server 103. First, at Step 501, image data of a sheet is stored in a temporary file, the image data being acquired by the image scanner 105 or acquired from the unrecognizable image file 210 via the network 10. At Step 502, the image data is read from the temporary file and displayed on the display screen of the sheet image management server 103. At Step 503, by using an input device of the sheet image managing server 103, sheets are classified into categories as viewed from various viewpoints, by using information necessary for the sheet recognizing process such as taxes, public utilities charges, and municipal names, and enters information such as the name of a category, a sheet name, a sheet acquisition date and acquisition source information. At Step 504, such information necessary for the sheet recognizing process together with the image data is stored in the sheet image database 104. Step 501, and Steps 502 to 504 may be executed in parallel as independent processes.

Figure 10:
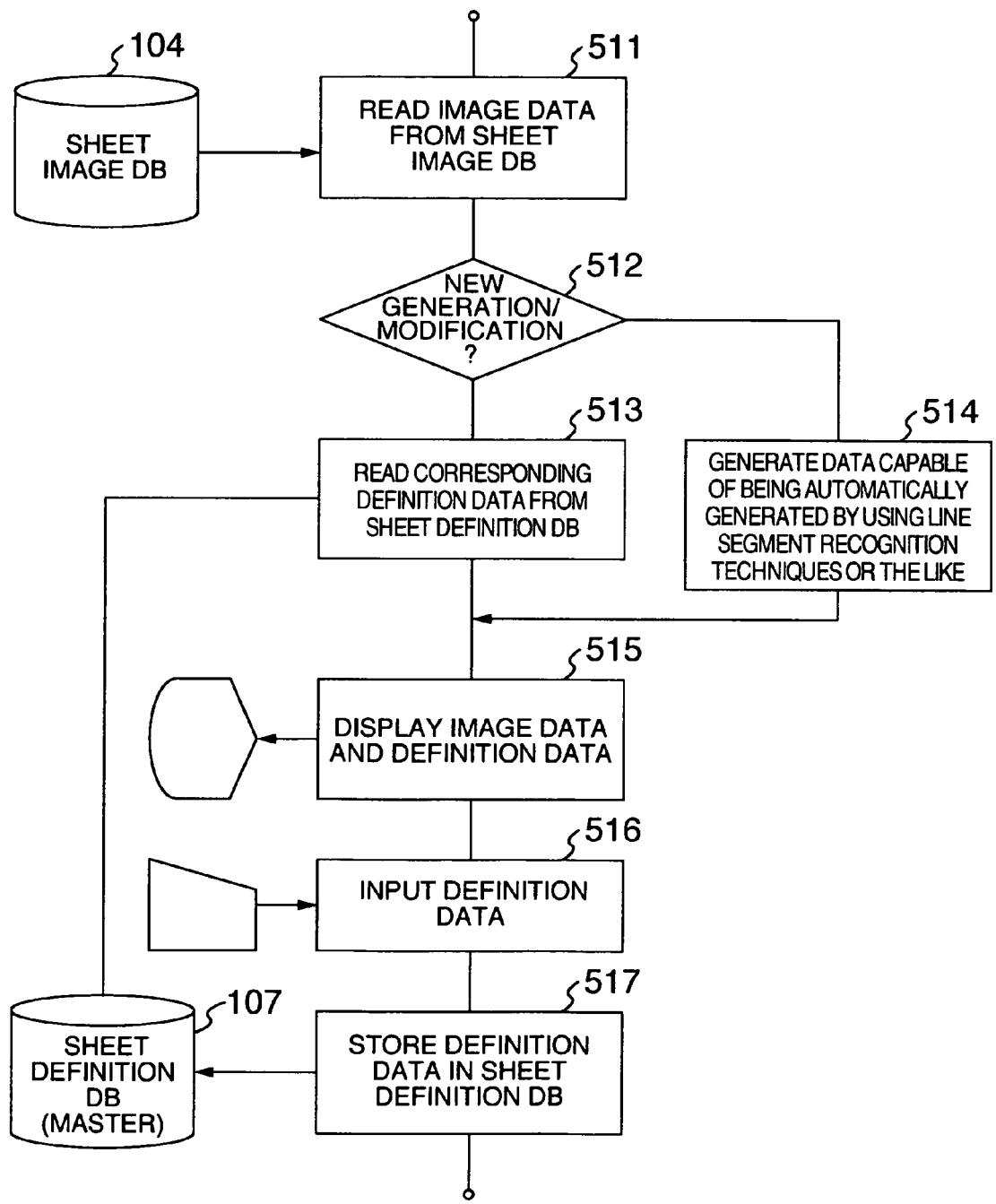
FIG. 10 is a flow chart illustrating an operation of a sheet defining terminal.

FIG. 10 is a flow chart illustrating the process to be executed by the sheet defining terminal 101. At Step 511, sheet image data is read from the sheet image database 104. At Step 512, it is checked whether an instruction of an operator is new generation of sheet definition data or modification thereof. In the case of the modification, the flow advances to Step 513, whereas in the case of the new generation, the flow advances to Step 514. At Step 513, the definition data corresponding to the read image data is read from the sheet definition database 107. At Step 514, the sheet image data is read by utilizing line segment recognition techniques or the like, and by referring to the read sheet image data, a portion of the sheet definition data is automatically generated. At Step 515, the sheet image data and generated or read sheet definition data are displayed. At Step 516, the sheet definition data is input or edited by using the input device of the sheet defining terminal. At Step 517 the sheet definition data is stored in the sheet definition database 107. The judgement at Step 512 may be executed first, and if the operator instruction is a modification instruction, the process at Step 513 is executed before the process at Step 511.

Figure 11:
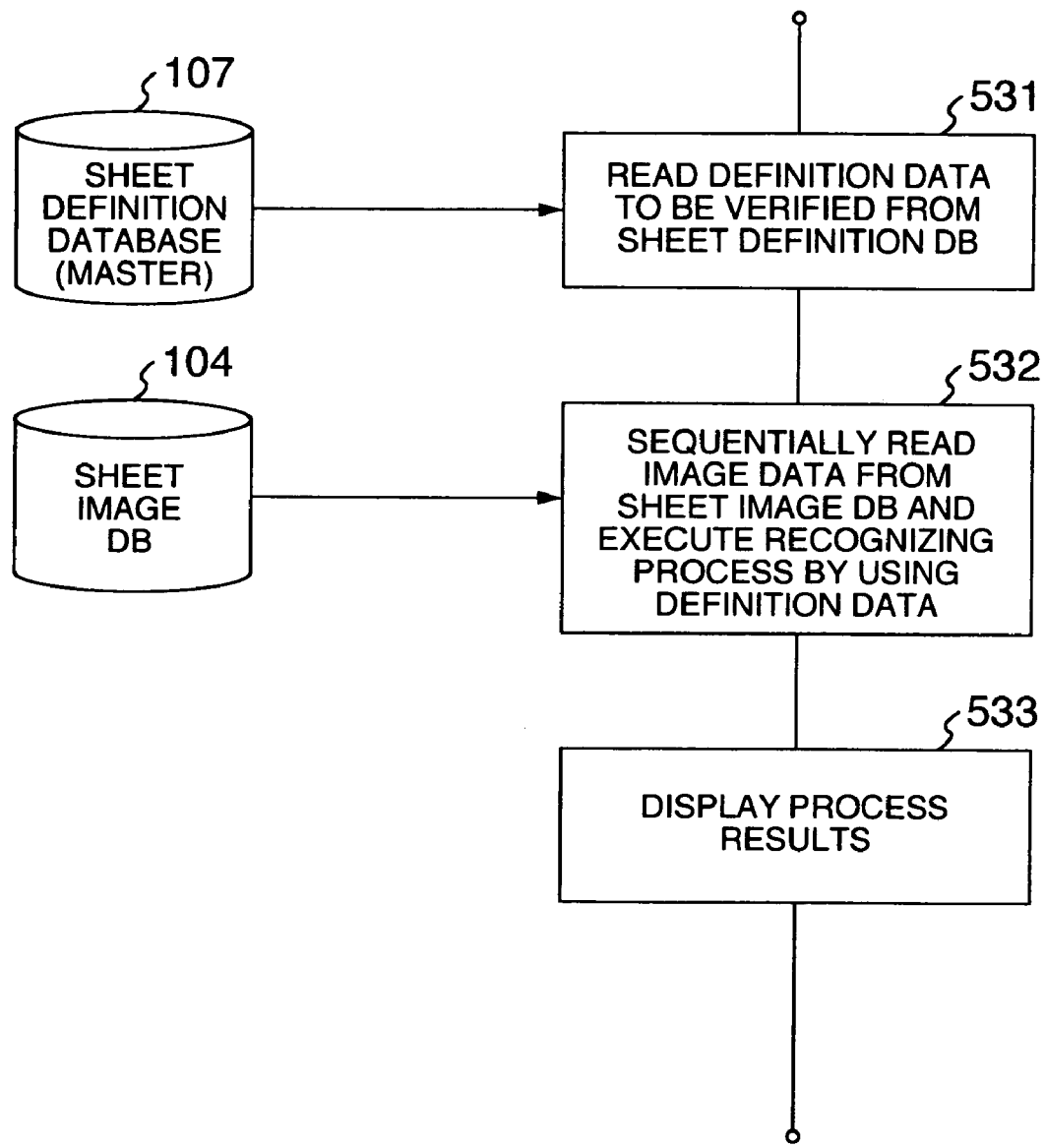
FIG. 11 is a flow chart illustrating a process to be executed by a sheet definition data verifying terminal.

FIG. 11 is a flow chart illustrating the process to be executed by the sheet definition data verifying terminal 102. First, at Step 531, sheet definition data to be verified is read from the sheet definition database 107. At Step 532, image data is sequentially read from the sheet image database 104 to execute a sheet recognizing process by using the sheet definition data. At Step 533, the obtained process results are displayed. Whether the process results are correct or not can be judged by the operator. Whether the process results are correct or not may be automatically judged by using a program which uses stored correct data to compare sequentially read sheet image data with the correct data. If it is judged that the process results are not correct, the sheet definition data input process shown in FIG. 10 is performed again.

FIG. 12 is a diagram showing a sheet management table stored in the sheet definition data managing server 106. The sheet definition data managing server 106 has a sheet management table 450 shown in FIG. 12 which table stores sheet definition data classified into each category. By referring to this sheet management table 450, the sheet definition data managing server 106 determines that the sheet definition data belonging to which category is supplied to each sheet recognizing apparatus 200. In FIG. 12, a ○ symbol indicates that the data is supplied being charged, a Δ symbol indicates that the data is supplied free, and no symbol indicates that the data is still not supplied. An initial registration date of sheet definition data and data necessary for management such as data change and history may also be stored in this table.

FIG. 13 is a diagram showing a charge table. The charge table 470 stores sheet definition data represented by the sheet ID and the number of use times of each set of the sheet definition data. In addition to the number of use times, the amount of use charge may also be stored.

FIGS. 14A and 14B are diagrams showing the management tables of the charge information managing server 111. A summing-up charge information table 610 shown in FIG. 14A stores the number of use times by each sheet recognizing apparatus, and a summed-up charge information table 611 shown in FIG. 14B is used for managing the claimed charge amount of each sheet recognizing apparatus. The summing-up charge information table 610 and summed-up charge information table 611 may be formed in unison. These tables may also be integrally formed with the management table of the sheet definition data managing server 106. By referring to the charge table shown in FIG. 13 and the information tables shown in FIGS. 14A and 14B, it is possible to recognize the number of use times and the use charge of the sheet definition data for each sheet recognizing apparatus so that a process to be described later can be executed such as a process of determining when the charge was claimed and whether the payment was settled.

Figure 15:
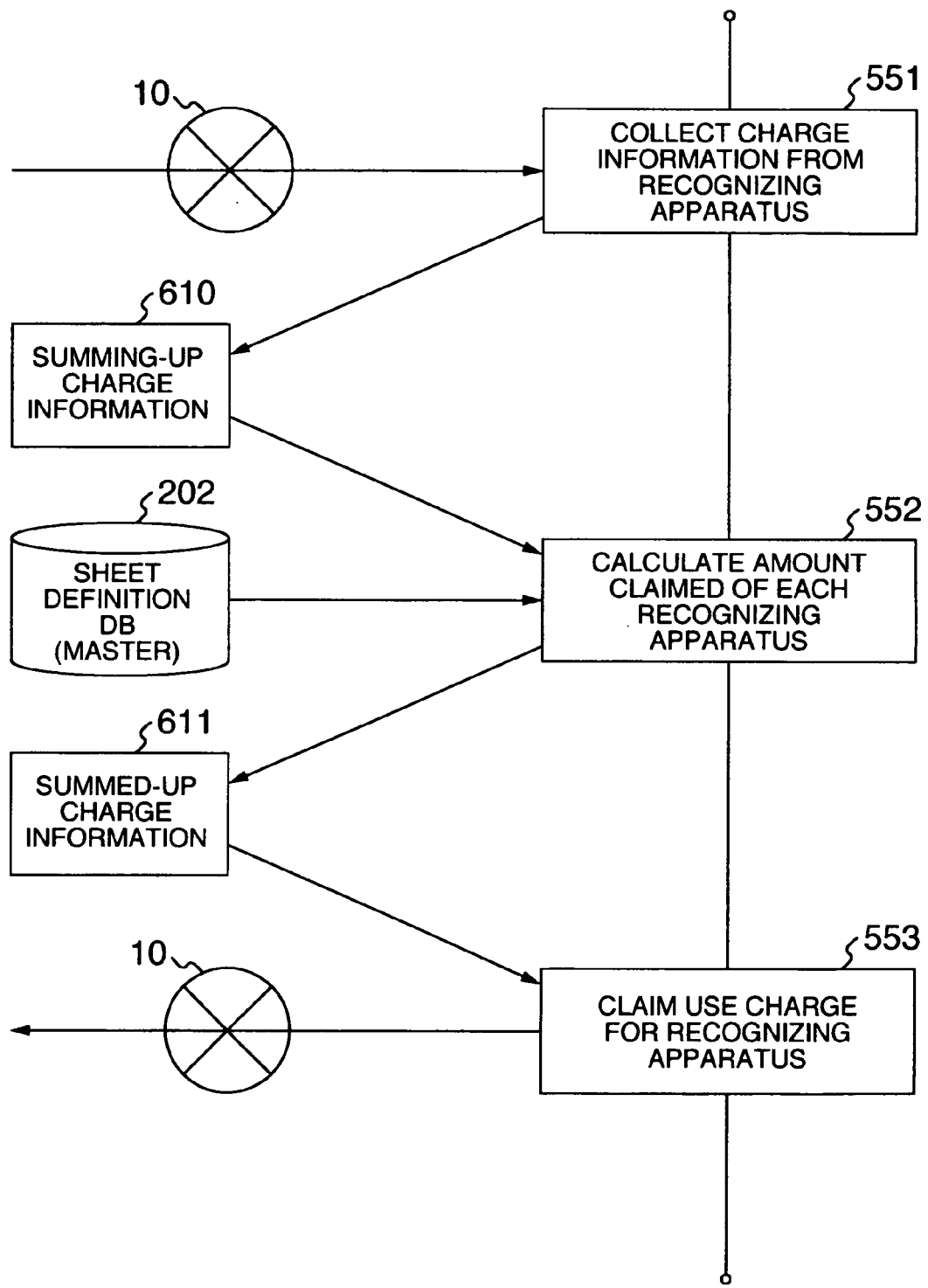
FIG. 15 is a flow chart illustrating a process to be executed by a charge information managing server.

FIG. 15 is a flow chart illustrating the process to be executed by the charge information managing server 111. First, at Step 551, at the predetermined date and time (e.g., in the first day of each month at A.M. 0), the charge information managing server 111 refers to the charge table 470 shown in FIG. 13 of the sheet recognizing apparatus 200 via the network 10, acquires data of the number of use times stored in the charge table, and writes the acquired data in the summing-up change information table 610. The sheet recognizing apparatus 200 may transmit the data of the number of use times stored in the charge table to the charge information managing server 111. At Step 552, by referring to the summing-up charge information table 610 storing the data of the number of use times and the sheet definition database 107, the charge information managing server 111 calculates the use charge of each sheet recognizing apparatus and stores the calculation results in the summed-up charge information table 611. At Step 553, the use charge is claimed to the sheet recognizing apparatus 200, for example, via the network 10. The sheet recognizing apparatus 200 side pays the use charge and the sheet definition data managing apparatus 100 side registers the payment date in the table shown in FIG. 14 as a payment flag.

Figure 16:
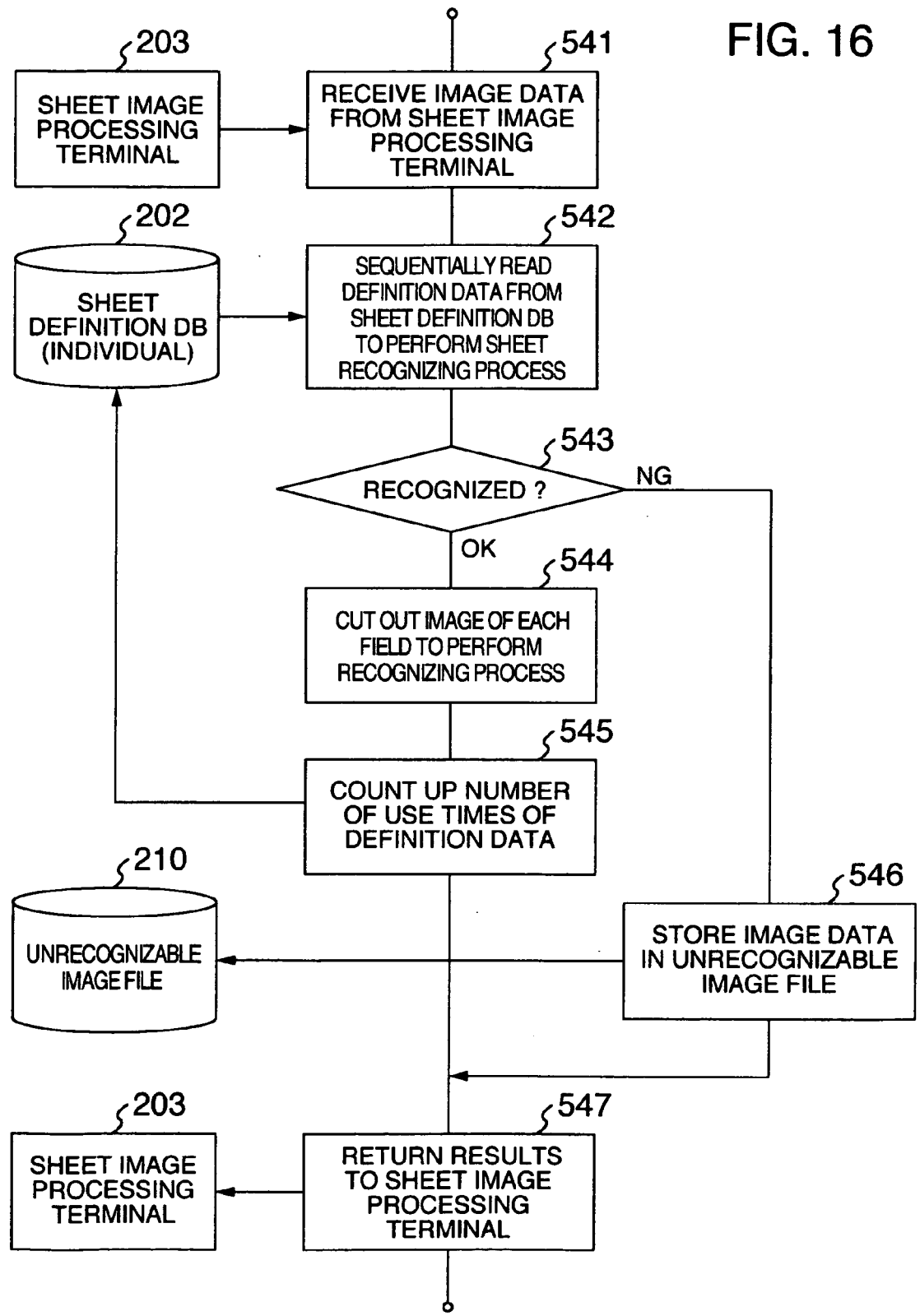
FIG. 16 is a flow chart illustrating a process to be executed by a recognizing server.

FIG. 16 is a flow chart illustrating the process to be executed by the recognizing server 201. First at Step 541, sheet image data is acquired from the sheet image processing terminal 203. At Step 542, sheet definition data is sequentially read from the sheet definition database (individual) 202, and by referring to the sheet layout information in the sheet definition data, a recognizing process is performed for the sheet read from the sheet image processing terminal 203. At Step 543, it is judged whether the sheet has the recognizable layout definition data and format definition data. If it has the recognizable data, the flow advances to Step 544, whereas if not, the flow skips to Step 546. At Step 544, by referring to the sheet format definition data in the sheet definition data, an image of each field is cut out to perform a sheet recognizing process. At Step 545, the number of use times of the sheet definition data is incremented by "1" and stored in the charge table 470 shown in FIG. 13. At Step 546, the unrecognizable sheet image data is stored in the unrecognizable image file 210. At Step 547, the recognition results of the sheet image are transmitted to the sheet image processing terminal 203.

Although it is judged at Step 543 whether the sheet has the recognizable layout definition data and format definition data, whether the sheet has the recognizable layout definition data and whether the sheet has the recognizable format definition data may be performed at different Steps, respectively.

In the foregoing description, the sheet definition data is transmitted from the sheet definition data managing apparatus 100 to the sheet recognizing apparatus 200, and the recognizing server on the side of the sheet recognizing apparatus 200 executes a process of recognizing the type of a sheet. The recognizing server may be provided on the side of the sheet definition data managing apparatus 100. Namely, the type of a sheet is recognized by receiving the sheet image data to be recognized from the sheet recognizing apparatus without transmitting the sheet definition data to the sheet recognizing apparatus 200. In this case, the sheet recognizing apparatus 200 side can be realized by a simple structure having only the sheet image processing terminal 203 and image scanner 204.

The sheet definition managing apparatus 100 and sheet recognizing apparatus 200 may be realized by using a single computer. The sheet recognizing program on the sheet recognizing apparatus 200 side is required to be updated depending upon the system configuration order, for example, if the sheet definition data managing apparatus 100 having the database of the embodiment is required to be operated under the conditions that the sheet recognizing apparatus 200 is already operating by using another database. In this case, if it is difficult to update the program, a data format conversion function is built in the sheet definition data managing apparatus 100 or sheet recognizing apparatus 200.

As described above, according to the embodiment, for example, the sheet definition data managing apparatus can supply the sheet recognizing apparatus with new or modified sheet definition data as latest information, and the sheet recognizing apparatus recognizes the type of a read sheet in accordance with the supplied sheet definition data. Accordingly, the initial configuration cost of the sheet definition database can be reduced and use of the database can be promoted. The recognizing server collects unrecognizable sheet image data and transmits it to the sheet definition database to reflect it upon the database. It is therefore easy to make the sheet definition database full of latest information. The sheet definition data managing apparatus side can claim a charge for the service of supplying the sheet definition data, whereas the recognizing side can use latest sheet definition data by paying a charge corresponding to the number of use times.

As described above, according to the invention, the sheet definition data stored in the sheet definition data managing apparatus is supplied to the sheet recognizing apparatus when necessary. It is therefore possible to reduce the initial configuration cost of the sheet definition database and promote use of the database.

What is claimed is:

1. A sheet definition data managing apparatus, comprising:
    a sheet defining terminal for generating sheet definition data for defining characteristics of various sheets;
    a sheet definition data managing server for storing and managing the sheet definition data; and
    a charge managing server for managing the number of use times each time each of the various sheets is recognized by using the sheet definition data,
    wherein charge information stored in said charge managing server is collected from an external via a network, a charge to be claimed is calculated from the collected charge information, and the calculated use charge is claimed for the external; and
    wherein when image data of a sheet acquired from the sheet definition data is recognized and if the image data is recognizable, a count of the number of use times is incremented, whereas if the image data is unrecognizable, the unrecognizable image data of the sheet is stored.

2. A sheet definition data managing apparatus according to claim 1,
    wherein the sheet definition data managing server stores information of sheet definition data supplied being charged, sheet information data supplied free, and sheet information data still not supplied, and a charge is claimed to the external by referring to the information.

3. A sheet definition data managing apparatus according to claim 1,
    wherein the external connected to the apparatus has a plurality of sheet recognizing apparatus for recognizing each sheet, and said charge managing server has a first table for storing the number of use times by each of said sheet recognizing apparatus and a second table for managing a charge amount to be claimed to each of said sheet recognizing apparatus, and checks the number of use times and a claimed date of the sheet definition data for each of said sheet recognizing apparatus by referring to the first and second tables.

4. A sheet definition data managing apparatus according to claim 1,
wherein the external connected to the apparatus has a plurality of sheet recognizing apparatus for recognizing each sheet, and said charge managing server has a first table for storing the number of use times by each of said sheet recognizing apparatus and a second table for managing a charge amount to be claimed to each of said sheet recognizing apparatus, collects the numbers of use times of the sheet definition data from said sheet recognizing apparatus at a desired date and time to write the numbers of use times in the first table, calculates a use charge of each of said sheet recognizing apparatus by referring to the first table to write the calculation results in the second table, claims the use charge to each of said sheet recognizing apparatus by referring to the second table, and when each of said sheet recognizing apparatus pays the claimed use charge, writes a flag indicating the payment in the second table.

5. A sheet recognizing apparatus comprising:
image acquiring means for acquiring image data of a sheet;
a sheet definition database for storing sheet definition data defining characteristics of the sheet, and
a sheet image processing terminal for recognizing the image data of the sheet acquired by said image acquiring means by referring to the sheet definition data stored in said sheet definition database,
wherein said sheet image processing terminal reads the sheet definition data corresponding to the image data of the sheet acquired by said image acquiring means from said sheet definition database to execute a recognizing process, if the image data is recognizable, displays a result of the recognizing process, whereas if the image data is unrecognizable, reports the unrecognizable image data of the sheet to an external, stores new sheet definition data obtained from the external in response to the report in said sheet definition database, and recognizes the unrecognizable image data of the sheet by referring to the new sheet definition data stored in said sheet definition database.

6. A sheet recognizing apparatus according to claim 5, wherein the sheet definition data stored in said sheet definition database includes layout definition data for distinguishing between types of sheets and format definition data for identifying a field in each sheet.

7. A sheet recognizing apparatus according to claim 5, wherein the recognizing process includes a process of judging whether the image data can be recognized by using the sheet definition data stored in said sheet definition database, and the apparatus further comprises an unrecognizable image file for storing unrecognizable image data of a file.

8. A sheet recognizing apparatus according to claim 5, further comprising a charge table for storing the number of use times each time the sheet definition data stored in said sheet definition database is used.

9. A sheet recognizing apparatus according to claim 8, wherein the number of use times stored in said charge table is reported to the external, and a use charge of the sheet definition data corresponding to the number of use times and claimed from the external is paid to the external.

10. A sheet recognizing apparatus according to claim 8, wherein the external connected to the apparatus includes a sheet definition data managing apparatus for generating and managing the sheet definition data stored in said sheet definition database.

11. A managing apparatus, comprising:
a managing server f or defining a characteristic field of a sheet and storing and managing sheet definition data necessary for recognizing the sheet;
a charge server for storing and managing information on a charge of the sheet definition data, and
a plurality of sheet recognizing apparatus, connected to said managing server, for recognizing each sheet,
wherein, said charge server claims a charge each time said managing server supplies the sheet definition data; and
wherein said charge managing server has a first table for storing the number of use times by each of said sheet recognizing apparatus and a second table for managing a charge amount to be claimed to each of said sheet recognizing apparatus, and checks the number of use times and a claimed date of the sheet definition data for each of said sheet recognizing apparatus by referring to the first and second tables.

12. A managing apparatus according to claim 11,
wherein said charge managing server collects the numbers or use times of the sheet definition data from said sheet recognizing apparatus at a desired date and time to write the numbers of use times in the first table, calculates a use charge for each of said sheet recognizing apparatus by referring to the first table to write the calculation results in the second table, claims the use charge for each of said sheet recognizing apparatus by referring to the second table, and when each of said sheet recognizing apparatus pays the claimed use charge, writes a flag indicating the payment in the second table.

13. A sheet charging method for charging to an execution of sheet recognition, the method comprising the steps of:
generating sheet definition data representative of characteristics of a sheet and configuring a sheet definition database;
making a contract to use the sheet definition data between a sheet definition data managing apparatus for managing the sheet definition data and a sheet recognizing apparatus for recognizing the sheet by using the sheet definition data;
making the sheet definition data managing apparatus configure the sheet definition data satisfying requirements of the sheet recognizing apparatus and transmit the configured sheet definition data to the sheet recognizing apparatus;
making the sheet recognizing apparatus recognize acquired image data of the sheet by using the received sheet definition data and store charge information corresponding to the number of use times of the sheet definition data;
making the sheet definition data managing apparatus acquire the charge information from the sheet recognizing apparatus and sum up the acquired charge information, and claim a use charge to the sheet recognizing apparatus in accordance with a summed-up result; and making the sheet recognizing apparatus pay the claimed use charge to the sheet definition data managing apparatus.

14. A sheet charging method according to claim 13, further comprising the steps of:

storing image data unable to be recognized by the sheet recognizing apparatus even by using the sheet definition data; and making the sheet definition data managing apparatus read the unrecognizable sheet image data from the sheet recognizing apparatus and supplement or update the sheet definition data generated by using the read image data.

* * * * *